(12) United States Patent
Tada et al.

(10) Patent No.: US 8,043,522 B2
(45) Date of Patent: Oct. 25, 2011

(54) FERRITE MATERIAL AND METHOD FOR PRODUCING FERRITE MATERIAL

(75) Inventors: Tomoyuki Tada, Osaka (JP); Yasuharu Miyoshi, Osaka (JP); Takeshi Yanagihara, Shizuoka (JP)

(73) Assignee: Hitachi Metals, Ltd., Tokyo (JP)

( * ) Notice: Subject to any disclaimer, the term of this patent is extended or adjusted under 35 U.S.C. 154(b) by 588 days.

(21) Appl. No.: 12/230,488

(22) Filed: Aug. 29, 2008

(65) Prior Publication Data
US 2009/0057606 A1 Mar. 5, 2009

(30) Foreign Application Priority Data

Aug. 31, 2007 (JP) ................................. 2007-225688
Aug. 13, 2008 (JP) ................................. 2008-208663

(51) Int. Cl.
*H01F 1/34* (2006.01)
*C04B 35/26* (2006.01)

(52) U.S. Cl. .................. 252/62.61; 252/62.6; 252/62.62

(58) Field of Classification Search ............... 252/62.61, 252/62.6, 62.62
See application file for complete search history.

(56) References Cited

FOREIGN PATENT DOCUMENTS
JP 2004-153197 A 5/2004
JP 2007-076964 * 3/2007

* cited by examiner

*Primary Examiner* — Carol M Koslow
(74) *Attorney, Agent, or Firm* — Birch, Stewart, Kolasch & Birch, LLP

(57) ABSTRACT

The invention provides a ferrite material (ferrite sintered body, ferrite powders) having a composition formula of $(1-x-y-z)(Li_{0.5}Fe_{0.5})O \cdot xZnO \cdot y(Mn,Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of $a=Mn/(Mn+Fe)$. At least one of Co oxide, Co hydroxide, and Co carbonate in an amount of 1 wt. % or less on the basis of CoO may be contained in 100 wt % of the ferrite material. The ferrite material has a normalized impedance $Z_N$ of 40000 Ω/m or more at 30 MHz and a normalized impedance $Z_N$ of 60000 Ω/m or more at 100 MHz as well as a specific resistance of $10^6$ Ωm or more.

14 Claims, 5 Drawing Sheets

| SPECIMEN NUMBER | MAIN COMPONENT COMPOSITION (mol%) | | | | Mn/(Fe+Mn) | $\mu i$ (f=100kHz) | NORMALIZED IMPEDANCE $Z_N(\Omega/m)$ | | $\rho$ (Ωm) | CHANGE RATE OF $\mu i$ (%) |
|---|---|---|---|---|---|---|---|---|---|---|
| | $(Li_{0.5}Fe_{0.5})O$ | ZnO | CuO | $(Fe,Mn)_2O_3$ (EXCLUDING $Fe_2O_3$ IN $(Li_{0.5}Fe_{0.5})O$) | | | f=30MHz | f=100MHz | | |
| 1* | 23.8 | 13.2 | 13.0 | 50.0 | 0.04 | 162 | 30500 | 64100 | $1.2 \times 10^6$ | −1.9 |
| 2* | 22.0 | 15.0 | 13.0 | 50.0 | 0.04 | 223 | 37900 | 65500 | $3.3 \times 10^6$ | −2.8 |
| 3 | 19.5 | 17.5 | 13.0 | 50.0 | 0.04 | 285 | 40200 | 65200 | $2.7 \times 10^6$ | −3.5 |
| 4 | 15.7 | 21.3 | 13.0 | 50.0 | 0.04 | 320 | 40800 | 64900 | $3.9 \times 10^6$ | −3.5 |
| 5 | 12.3 | 24.7 | 13.0 | 50.0 | 0.04 | 382 | 41100 | 64800 | $4.5 \times 10^6$ | −5.1 |
| 6 | 10.2 | 26.8 | 13.0 | 50.0 | 0.04 | 410 | 42000 | 63200 | $4.1 \times 10^6$ | −7.2 |
| 7 | 8.0 | 29.0 | 13.0 | 50.0 | 0.04 | 438 | 42900 | 61300 | $6.5 \times 10^6$ | −9.8 |
| 8* | 4.8 | 32.2 | 13.0 | 50.0 | 0.04 | 467 | 43600 | 57400 | $5.0 \times 10^6$ | −12.5 |

F I G. 1

| SPECIMEN NUMBER | MAIN COMPONENT COMPOSITION (mol%) | | | | Mn/(Fe+Mn) | $\mu i$ (f=100kHz) | NORMALIZED IMPEDANCE $Z_N (\Omega/m)$ | | $\rho$ ($\Omega \cdot m$) | CHANGE RATE OF $\mu i$ (%) |
|---|---|---|---|---|---|---|---|---|---|---|
| | $(Li_{0.5}Fe_{0.5})O$ | ZnO | CuO | $(Fe,Mn)_2O_3$ (EXCLUDING $Fe_2O_3$ IN $(Li_{0.5}Fe_{0.5})O$) | | | f=30MHz | f=100MHz | | |
| 1* | 23.8 | 13.2 | 13.0 | 50.0 | 0.04 | 162 | 30500 | 64100 | $1.2 \times 10^6$ | −1.9 |
| 2* | 22.0 | 15.0 | 13.0 | 50.0 | 0.04 | 223 | 37900 | 65500 | $3.3 \times 10^6$ | −2.8 |
| 3 | 19.5 | 17.5 | 13.0 | 50.0 | 0.04 | 285 | 40200 | 65200 | $2.7 \times 10^6$ | −3.5 |
| 4 | 15.7 | 21.3 | 13.0 | 50.0 | 0.04 | 320 | 40800 | 64900 | $3.9 \times 10^6$ | −3.5 |
| 5 | 12.3 | 24.7 | 13.0 | 50.0 | 0.04 | 382 | 41100 | 64800 | $4.5 \times 10^6$ | −5.1 |
| 6 | 10.2 | 26.8 | 13.0 | 50.0 | 0.04 | 410 | 42000 | 63200 | $4.1 \times 10^6$ | −7.2 |
| 7 | 8.0 | 29.0 | 13.0 | 50.0 | 0.04 | 438 | 42900 | 61300 | $6.5 \times 10^6$ | −9.8 |
| 8* | 4.8 | 32.2 | 13.0 | 50.0 | 0.04 | 467 | 43600 | 57400 | $5.0 \times 10^6$ | −12.5 |

F I G. 2

| SPECIMEN NUMBER | MAIN COMPONENT COMPOSITION (mol%) | | | | Mn/(Fe+Mn) | $\mu i$ (f=100kHz) | NORMALIZED IMPEDANCE $Z_N$ (Ω/m) | | $\rho$ (Ωm) | CHANGE RATE OF $\mu i$ (%) |
|---|---|---|---|---|---|---|---|---|---|---|
| | $(Li_{0.5}Fe_{0.5})O$ | ZnO | CuO | $(Fe,Mn)_2O_3$ (EXCLUDING $Fe_2O_3$ IN $(Li_{0.5}Fe_{0.5})O$ | | | f=30MHz | f=100MHz | | |
| 9* | 13.5 | 27.2 | 14.3 | 45.0 | 0.04 | 321 | 33900 | 54100 | $8.7 \times 10^6$ | -2.6 |
| 10 | 12.9 | 25.9 | 13.7 | 47.5 | 0.04 | 353 | 40200 | 60300 | $7.9 \times 10^6$ | -2.5 |
| 11 | 12.5 | 25.2 | 13.3 | 49.0 | 0.04 | 388 | 40900 | 63600 | $4.8 \times 10^6$ | -3.8 |
| 12 | 12.3 | 24.7 | 13.0 | 50.0 | 0.04 | 382 | 41100 | 64800 | $4.5 \times 10^6$ | -5.1 |
| 13 | 12.2 | 24.5 | 12.9 | 50.5 | 0.04 | 366 | 41500 | 66500 | $2.6 \times 10^6$ | -6.5 |
| 14 | 12.1 | 24.2 | 12.7 | 51.0 | 0.04 | 332 | 42100 | 64100 | $2.2 \times 10^6$ | -6.9 |
| 15* | 11.8 | 23.7 | 12.5 | 52.0 | 0.04 | 223 | 36400 | 57000 | $5.1 \times 10^5$ | -6.0 |
| 16* | 11.6 | 23.2 | 12.2 | 53.0 | 0.04 | 151 | 32700 | 50200 | $8.3 \times 10^4$ | -6.2 |

FIG. 3

| SPECIMEN NUMBER | MAIN COMPONENT COMPOSITION (mol%) | | | | Mn/(Fe+Mn) | $\mu i$ (f=100kHz) | NORMALIZED IMPEDANCE $Z_N(\Omega/m)$ | | $\rho$ ($\Omega \cdot m$) | CHANGE RATE OF $\mu i$ (%) |
|---|---|---|---|---|---|---|---|---|---|---|
| | $(Li_{0.5}Fe_{0.5})O$ | ZnO | CuO | $(Fe,Mn)_2O_3$ (EXCLUDING $Fe_2O_3$ IN $(Li_{0.5}Fe_{0.5})O$ | | | f=30MHz | f=100MHz | | |
| 17* | 22.5 | 27.5 | 0 | 50.0 | 0.04 | 250 | 24400 | 49000 | $7.9 \times 10^5$ | -1.5 |
| 18* | 20.1 | 26.9 | 3.0 | 50.0 | 0.04 | 361 | 36500 | 57700 | $2.3 \times 10^6$ | -2.2 |
| 19 | 16.8 | 26.2 | 7.0 | 50.0 | 0.04 | 421 | 40600 | 61400 | $5.9 \times 10^6$ | -4.2 |
| 20 | 14.5 | 25.5 | 10.0 | 50.0 | 0.04 | 432 | 41700 | 62500 | $4.9 \times 10^6$ | -4.7 |
| 21 | 12.3 | 24.7 | 13.0 | 50.0 | 0.04 | 382 | 41100 | 64800 | $4.5 \times 10^6$ | -5.1 |
| 22 | 9.8 | 24.2 | 16.0 | 50.0 | 0.04 | 383 | 41600 | 65800 | $4.6 \times 10^6$ | -6.5 |
| 23 | 7.4 | 23.6 | 19.0 | 50.0 | 0.04 | 343 | 43400 | 69000 | $3.2 \times 10^6$ | -6.6 |
| 24 | 5.0 | 23.0 | 22.0 | 50.0 | 0.04 | 282 | 41500 | 66300 | $1.8 \times 10^6$ | -8.1 |
| 25* | 3.2 | 21.8 | 25.0 | 50.0 | 0.04 | 261 | 38100 | 62200 | $6.9 \times 10^5$ | -10.5 |

F I G. 4

| SPECIMEN NUMBER | MAIN COMPONENT COMPOSITION (mol%) | | | | Mn/(Fe+Mn) | $\mu_i$ (f=100kHz) | NORMALIZED IMPEDANCE $Z_N(\Omega/m)$ | | $\rho$ ($\Omega \cdot m$) | CHANGE RATE OF $\mu_i$ (%) |
|---|---|---|---|---|---|---|---|---|---|---|
| | $(Li_{0.5}Fe_{0.5})O$ | ZnO | CuO | $(Fe,Mn)_2O_3$ (EXCLUDING $Fe_2O_3$ IN $(Li_{0.5}Fe_{0.5})O$ | | | f=30MHz | f=100MHz | | |
| 26* | 12.3 | 24.7 | 13.0 | 50.0 | 0 | 408 | 35900 | 54000 | $6.9 \times 10^7$ | -9.1 |
| 27* | 12.3 | 24.7 | 13.0 | 50.0 | 0.01 | 405 | 38500 | 56200 | $2.3 \times 10^7$ | -7.5 |
| 28 | 12.3 | 24.7 | 13.0 | 50.0 | 0.02 | 398 | 40400 | 61500 | $7.4 \times 10^6$ | -7.1 |
| 29 | 12.3 | 24.7 | 13.0 | 50.0 | 0.04 | 382 | 41100 | 64800 | $4.5 \times 10^6$ | -5.1 |
| 30 | 12.3 | 24.7 | 13.0 | 50.0 | 0.055 | 360 | 40800 | 65500 | $1.1 \times 10^6$ | -4.5 |
| 31* | 12.3 | 24.7 | 13.0 | 50.0 | 0.07 | 341 | 38900 | 66700 | $8.3 \times 10^5$ | -4.1 |

F I G. 5

| SPECIMEN NUMBER | MAIN COMPONENT COMPOSITION (mol%) | | | | Mn/(Fe+Mn) | ADDITIVE (wt%) | $\mu i$ (f=100kHz) | NORMALIZED IMPEDANCE $Z_N (\Omega/m)$ | | $\rho$ ($\Omega$m) | CHANGE RATE OF $\mu i$ (%) |
|---|---|---|---|---|---|---|---|---|---|---|---|
| | $(Li_{0.5}Fe_{0.5})O$ | ZnO | CuO | $(Fe,Mn)_2O_3$ (EXCLUDING $Fe_2O_3$ IN $(Li_{0.5}Fe_{0.5})O$) | | CoO | | f=30MHz | f=100MHz | | |
| 32 | 12.3 | 24.7 | 13.0 | 50.0 | 0.04 | 0 | 382 | 41100 | 64800 | $4.5 \times 10^6$ | −5.1 |
| 33 | 12.3 | 24.7 | 13.0 | 50.0 | 0.04 | 0.50 | 327 | 43500 | 66871 | $4.6 \times 10^6$ | −6.2 |
| 34 | 12.3 | 24.7 | 13.0 | 50.0 | 0.04 | 1.00 | 249 | 45900 | 65700 | $5.6 \times 10^6$ | −8.8 |
| 35* | 12.3 | 24.7 | 13.0 | 50.0 | 0.04 | 1.50 | 248 | 42000 | 59900 | $5.9 \times 10^6$ | −11.6 |
| 36* | 12.3 | 24.7 | 13.0 | 50.0 | 0.04 | 2.00 | 171 | 36400 | 54300 | $6.1 \times 10^6$ | −16.3 |

FERRITE MATERIAL AND METHOD FOR PRODUCING FERRITE MATERIAL

CROSS-REFERENCE TO RELATED APPLICATIONS

This Nonprovisional application claims priority under 35 U.S.C. §119(a) on Patent Application No. 2007-225688 filed in Japan on Aug. 31, 2007 and No. 2008-208663 filed in Japan on Aug. 13, 2008, the entire contents of which are hereby incorporated by reference.

BACKGROUND OF THE INVENTION

1. Field of the Invention

The present invention relates to a ferrite material having high impedance in a high-frequency band, and a method for producing the same.

2. Description of Related Art

Various types of noise filters for inhibiting transmission of noise of electronic appliances have been proposed and employed, and as filters for inhibiting transmission of signal components in a high-frequency band, for example, noise filters obtained by winding coils on ferrite cores have been known.

For these noise filters, magnetic impedance of ferrite materials has be utilized, and along with the miniaturization of various types of electronic appliances in recent years, ferrite materials having high impedance particularly in a high-frequency band have been desired.

Conventionally, Mn—Zn-based or Ni—Zn-based ferrite materials have been employed. Since Mn—Zn-based ferrite materials have high magnetic permeability, the materials have high impedance in kHz band, however the specific resistance thereof is as low as 1 $\Omega$m and therefore, loss due to eddy current in the ferrites is increased in MHz band. Accordingly, the impedance is lowered at frequency of 10 MHz or more and the materials are difficult to be used for removing noise in a high-frequency band of 30 MHz or more. Furthermore, since the specific resistance is low, it is also difficult to directly wind a coil on a core and production steps such as a step of inserting an insulating material between the core and the coil are increased and the miniaturization is thus difficult.

On the other hand, since Ni—Zn-based ferrites have resistivity as high as $10^6$ $\Omega$m or more, the effect of eddy current loss is small, and high impedance can be obtained at a frequency of 10 MHz or more as compared with the Mn—Zn-based ferrites. Therefore, the Ni—Zn-based ferrites are mainly used for removing noise in a high-frequency band of 30 MHz or more. Further, since the Ni—Zn-based ferrites have high specific resistance, the ferrites have advantages that direct winding of a coil on a core is possible and the miniaturization is also possible.

However, since the Ni—Zn-based ferrites have high magnetostriction and show large change of magnetic characteristics by external stress, if a coiling is firmed on a ferrite core and thereafter molding with a resin is carried out in order to improve the reliability, there is a problem of changing magnetic permeability by the stress. Further, since costly Ni is contained as a main component, there is another problem that production cost is high.

As a material containing no costly Ni and having small magnetostriction, Li-based ferrite materials have been known. For example, Japanese Patent Application Laid-Open No. 2004-153197 has proposed a Li—Cu—Zn ferrite having a material composition defined as $Li_{0.5x}Zn_zCu_aFe_{2+0.5x-y}Mn_yO_4$ (0.10<x<1.00; 0.13<y<0.80; 0<z<0.90; 0.02<a<0.40; and 0.5x+z+a≠1), so that low temperature sintering is made possible and improved specific resistance can be thus achieved.

SUMMARY OF THE INVENTION

The above-mentioned Li—Cu—Zn ferrite is obtained as a low temperature sintering type ferrite material which can be fired simultaneously with a silver internal conductor to be used for layered electronic parts and thus impedance characteristic required for uses for noise filters and the like is not considered at all. Further, since the above-mentioned Li—Cu—Zn ferrite contains Mn as an essential element and the content of Mn is relatively high, it is supposed that the initial magnetic permeability is lowered contrarily to the specific resistance improvement and it is also supposed that the impedance is decreased along therewith.

As described, with respect to a conventional Li-based ferrite, any ferrite material having high impedance in a high-frequency band and suitable for uses for a noise filter and the like has not been proposed yet.

An object of the present invention is to provide a ferrite material having high impedance in a high-frequency band, so high specific resistance to enable to be directly wound on a core, and small change of magnetic characteristics by external stress, producible at a low cost, and usable for core materials of coil parts such as noise filters, choke coil, or electric wave absorbers.

Further, another object of the present invention is to provide a method for simply producing the ferrite material (a ferrite sintered body, ferrite powders) at a high precision.

The present inventors have intensively studied about a Li-based ferrite composition in order to accomplish the objects, and therefore have found that with respect to Li—Zn—Mn—Cu ferrites, it is made possible to obtain a ferrite material which has high impedance in a frequency band of 30 MHz or more and a specific resistance of $10^6$ $\Omega$m or more while keeping the intrinsic characteristic of a Li-based ferrite that the magnetostriction is low and its cost is lowered without using Ni by adding a relatively high amount of Cu and defining the Mn amount within a predetermined range.

The present inventors further have found that the impedance can be improved more in a frequency band of 30 MHz or more by adding a small amount of at least one of Co oxide, Co hydroxide, and Co carbonate to the above-mentioned ferrite material.

The ferrite material of the present invention has a composition formula of $(1-x-y-z)(Li_{0.5}Fe_{0.5})O \cdot xZnO \cdot y(Mn,Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of a=Mn/(Mn+Fe).

The ferrite material of the present invention contains 1 wt. % or less (on the basis of Co oxide) of at least one of Co oxide, Co hydroxide, and Co carbonate as an additive relative to 100 wt. % of the above-mentioned ferrite material.

In the ferrite material having the above-mentioned constitution, the ferrite material of the present invention has a normalized impedance $Z_N$ of 40000 $\Omega$/m or more at 30 MHz and a normalized impedance $Z_N$ of 60000 $\Omega$/m or more at 100 MHz.

In the ferrite material having the above-mentioned constitution, the ferrite material of the present invention has a specific resistance of $10^6$ $\Omega$m or more.

In the ferrite material having the above-mentioned constitution, the ferrite material of the present invention has a change rate of the initial magnetic permeability within ±10% when a pressure is applied at a pressure of 30 MPa.

Embodiments of the ferrite material of the present invention may include a ferrite sintered body obtained by successively calcinating, grinding, molding and firing raw material powders; ferrite powders obtained by firing raw material powders; ferrite powders obtained by successively calcinating, grinding and firing raw material powders; and ferrite powders obtained by successively calcinating, grinding, molding, firing, and grinding raw material powders. The average particle diameter of the ferrite powders may be properly selected in several μm to several hundred μm depending on the uses.

The method for producing the ferrite material (ferrite sintered body) of the present invention includes steps of preparing raw material powders having a composition formula of $(1-x-y-z)(Li_{0.5}Fe_{0.5})O \cdot xZnO \cdot y(Mn, Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of $a=Mn/(Mn+Fe)$; obtaining calcinated powders by calcinating the raw material powders; obtaining grinded powders by grinding the calcinated powders; obtaining a molded body by molding the grinded powders; and obtaining a ferrite sintered body by firing the molded body.

The method for producing the ferrite material (ferrite powders) of the present invention includes steps of preparing raw material powders having a composition formula of $(1-x-y-z)(Li_{0.5}Fe_{0.5})O \cdot xZnO \cdot y(Mn, Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of $a=Mn/(Mn+Fe)$; and obtaining ferrite powders by firing the raw material powders. The temperature at the time of the firing is preferably 800° C. to 1050° C. The method may include a step of granulating the raw material powders between the steps of preparing the raw material powders and firing.

The method for producing the ferrite material (ferrite powders) of the present invention includes steps of preparing raw material powders having a composition formula of $(1-x-y-z)(Li_{0.5}Fe_{0.5})O \cdot xZnO \cdot y(Mn, Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of $a=Mn/(Mn+Fe)$; obtaining calcinated powders by calcinating the raw material powders; obtaining grinded powders by grinding the calcinated powders; and obtaining ferrite powders by firing the grinded powders. The method may include a step of granulating the grinded powders between the steps of grinding the calcinated powders and firing.

The method for producing the ferrite material (ferrite powders) of the present invention includes steps of preparing raw material powders having a composition formula of $(1-x-y-z)(Li_{0.5}Fe_{0.5})O \cdot xZnO \cdot y(Mn, Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of $a=Mn/(Mn+Fe)$; obtaining calcinated powders by calcinating the raw material powders; obtaining grinded powders by grinding the calcinated powders; obtaining a molded body by molding the grinded powders; obtaining a ferrite sintered body by firing the molded body; and obtaining ferrite powders by grinding the sintered body.

The method for producing the ferrite material (ferrite sintered body, ferrite powders) of the present invention further includes a step of adding at least one of Co oxide, Co hydroxide, and Co carbonate in an amount of 1 wt. % or less on the basis of CoO relative to 100 wt. % of an object material to be added, before the firing is carried out.

According to the present invention, it is made possible to provide a ferrite material (ferrite sintered body, ferrite powders) having so high impedance in a high-frequency band so as to satisfy a normalized impedance $Z_N$ of 40000 Ω/m or more at 30 MHz and a normalized impedance $Z_N$ of 60000 Ω/m or more at 100 MHz. It is made possible to provide a noise filter that can efficiently inhibit transmission of noise in a high-frequency band by using this ferrite sintered body as a core material of coil parts such as noise filters, choke coils or the like.

Further, according to the present invention, it is made possible to provide a ferrite material (ferrite sintered body, ferrite powders) having a high specific resistance of $10^6$ Ωm or more. Since direct wiring on a core is made possible by using the ferrite sintered body as a core material of coil parts such as noise filters, choke coils or the like, the step of inserting an insulating material can be shortened and coil parts can be miniaturized.

Furthermore, according to the present invention, since a ferrite material (ferrite sintered body, ferrite powders) having small magnetostriction and small change rate of magnetic characteristics by external stress can be obtained, variation of magnetic characteristics can be lessened by using the ferrite sintered body for core materials of coil parts such as noise filters, choke coils or the like which require a molding with a resin.

Furthermore, since the ferrite material (ferrite sintered body, ferrite powders) according to the present invention does not contain costly Ni, the production cost can be lowered and it is made possible to provide a ferrite sintered body suitable for core materials of coil parts such as noise filters, choke coils or the like at a low cost.

It is also made possible to provide an electric wave absorber having excellent electric wave absorption capability in a high-frequency band at a low cost by dispersing the ferrite powders of the present invention in a resin and molding the resulting mixture.

The above and further objects and features of the present invention will more fully be apparent from the following detailed description with accompanying drawings.

BRIEF DESCRIPTION OF THE SEVERAL VIEWS OF THE DRAWINGS

FIG. 1 is a drawing showing the compositions and characteristics in Adaptation Examples of Example 1/Comparative Example;

FIG. 2 is a drawing showing the compositions and characteristics in Adaptation Examples of Example 2/Comparative Example;

FIG. 3 is a drawing showing the compositions and characteristics in Adaptation Examples of Example 3/Comparative Example;

FIG. 4 is a drawing showing the compositions and characteristics in Adaptation Examples of Example 4/Comparative Example; and FIG. 5 is a drawing showing the compositions and characteristics in Adaptation Examples of Example 5/Comparative Example.

DETAILED DESCRIPTION OF THE INVENTION

Hereinafter, the reasons of limitation of the composition of the ferrite material according to the present invention will be described in detail.

In a composition formula: $(1-x-y-z)(Li_{0.5}Fe_{0.5})O \cdot xZnO \cdot y(Mn, Fe)_2O_3 \cdot zCuO$, x denotes a content ratio of ZnO, and it is preferably in a range from 0.175 to 0.29 (0.175 or more and 0.29 or less, and hereinafter, the meaning "to" is same). If it is less than 0.175, the initial magnetic permeability becomes low and the normalized impedance $Z_N$ at 30 MHz becomes less than 40000 Ω/m, and if it exceeds 0.29, although the normalized impedance $Z_N$ at 30 MHz exceeds 40000 Ω/m, the normalized impedance at 100 MHz becomes less than 60000 Ω/m and at the same time Curie temperature is lowered and thus these cases are not preferable.

The reference character y denotes the content ratio of $Fe_2O_3$ excluding Fe in $(Li_{0.5}Fe_{0.5})O$ and is preferably in a range from 0.475 to 0.51. If it is less than 0.475, it is not preferable since the normalized impedances $Z_N$ at 30 MHz and 100 MHz are lowered and if it exceeds 0.51, it is not preferable since the normalized impedances $Z_N$ at 30 MHz and 100 MHz are lowered and the specific resistance is also below $10^6$ Ωm. It is more preferably in a range from 0.49 to 0.51. $(Li_{0.5}Fe_{0.5})O$ is the residue of x, y, described above, and z described below.

The normalized impedances $Z_N$ at 30 MHz and 100 MHz can be improved by replacing a part of $Fe_2O_3$ with $Mn_2O_3$. In the case of a=Mn/(Mn+Fe), a is preferably in a range from 0.02 to 0.055. If it is less than 0.02, the effect of improving the normalized impedance $Z_N$ is not caused, and if it exceeds 0.055, the normalized impedance $Z_N$ at 30 MHz becomes below 40000 Ω/m and the specific resistance becomes below $10^6$ Ωm and therefore, it is not preferable.

One of the characteristics of the present invention is that the content ratio of $Mn_2O_3$ is defined in the above-mentioned range. In this connection, since the Mn content of the Li—Cu—Zn ferrite described in Japanese Patent Application Laid-Open No. 2004-153197 mentioned in "Description of Related art" is so high as to be 0.13 to 0.80 (13 mol % to 80 mol %), it is supposed that the initial magnetic permeability is lowered and along therewith, the normalized impedance $Z_N$ is also lowered and thus it is unsuitable to use the ferrite as a core material for coil parts such as noise filters. The content ratio of $Mn_2O_3$ in the present invention is converted to be 0.1262 or less (12.62 mol % or less) according to the general expression described in Japanese Patent Application Laid-Open No. 2004-153197.

In the composition formula, z denotes the content ratio of CuO, and it is preferably in a range from 0.07 to 0.22. A main characteristic of the present invention is that a relatively large amount of CuO is added. CuO replaces a portion of $(Li_{0.5}Fe_{0.5})O$ and addition of CuO in the above-mentioned range makes it possible to improve the normalized impedance $Z_N$ and to satisfy both of that the normalized impedance $Z_N$ at 30 MHz is 40000 Ω/m or more and that the normalized impedance $Z_N$ at 100 MHz is 60000 Ω/m or more. However, if z is less than 0.07, the effect of improving the normalized impedance $Z_N$ is not caused, and if it exceeds 0.22, the normalized impedance $Z_N$ at 30 MHz becomes below 40000 Ω/m and thus it is not preferable. It is more preferably in a range from 0.10 to 0.19.

If the above-mentioned reasons of limitation of the composition are satisfied, it is made possible to obtain a ferrite material which satisfies both that the normalized impedance $Z_N$ at 30 MHz is 40000 Ω/m or more and that the normalized impedance $Z_N$ at 100 MHz is 60000 Ω/m or more, has a specific resistance of $10^6$ Ωm or more and a rate of initial magnetic permeability within ±10% when a pressure is applied at a pressure of 30 MPa.

Further, the normalized impedance $Z_N$ in a high-frequency band can be improved more by adding 1 wt. % or less (on the basis of CoO) of at least one Co oxide, Co hydroxide, and Co carbonate in 100 wt. % of the ferrite material having the above-mentioned composition. If the content exceeds 1 wt. % on the basis of CoO, the magnetostriction of the material becomes high and the change of the magnetic characteristics by the external stress becomes large and the normalized impedances $Z_N$ at 30 MHz and 100 MHz are lowered, and thus it is not preferable.

The embodiments of the ferrite material according to the present invention having such compositions may include a ferrite sintered body obtained by successively calcinating, grinding, molding and firing raw material powders and ferrite powders obtained from raw material powders by various techniques as described below. For example, the ferrite sintered body can be used as a core material for coil parts such as noise filters, choke coils or the like. Further, an electric wave absorber having excellent electric wave absorption capability in a high-frequency band can be produced by dispersing the ferrite powders in a resin or the like, and molding the mixture in a prescribed shape. The average particle diameter of the ferrite powders according to the present invention may be properly selected from several μm to several hundred μm depending on the uses. It is preferable to make the powders with small variation of the particle diameter in consideration of the dispersibility in a resin and handling property.

Hereinafter, a method for producing a ferrite material (ferrite sintered body, ferrite powders) of the present invention will be described. At first, a method for producing a ferrite sintered body will be described.

A material having a composition formula: $(1-x-y-z)(Li_{0.5}Fe_{0.5})O \cdot xZnO \cdot y(Mn, Fe)_2O_3 \cdot zCuO$, in which x, y, z, and a satisfy $0.175 \leq x \leq 0.29$; $0.475 \leq y \leq 0.51$; $0.07 \leq z \leq 0.22$; and $0.02 \leq a \leq 0.055$ in the case of a=Mn/(Mn+Fe) or a material containing 1 wt. % or less (on the basis of CoO) of at least one of Co oxide, Co hydroxide, and Co carbonate as an additive relative to 100 wt. % of the above-mentioned ferrite material (an object material to be added) is prepared.

The step of preparing the above-mentioned material may be carried out before the firing step described below. That is, the above-mentioned material may be prepared in the respective steps of weighing, mixing, calcinating, grinding, and molding. For example, carbonate powders and oxide powders being starting raw materials of all elements are weighed, mixed and calcinated from the beginning, raw material powders other than raw material powders of Li or Co are previously weighed, mixed, and calcinated and then the raw material powders of Li or Co are mixed with the calcinated powders (an object material to be added) and thereafter, the resulting mixture may be grinded and molded. Alternatively, the powders are mixed with the grinded powders (an object material to be added) after the grinding and thereafter, the powder mixture may be fired.

In the calcinating step, the calcinating temperature is preferably 800° C. to 900° C. The calcinating time is preferably 2 hours to 5 hours. Further, the calcinating atmosphere is preferably in atmospheric air or in oxygen atmosphere.

In the grinding step, the grinding is carried out in pure water or ethanol. Further, the average particle diameter of the grinded powders after the grinding is 0.5 μm to 1.5 μm.

The grinded powders after the grinding are molded by desired molding means. Before molding, if necessary, the grinded powders may be granulated by a granulation apparatus. The molding pressure is preferably 70 MPa to 150 MPa.

The molded body obtained in the above-mentioned manner is fired to obtain a ferrite sintered body of the present invention. The firing temperature is preferably 950° C. to 1050° C. The firing time is preferably 2 to 5 hours. The firing atmosphere is preferably atmospheric air or oxygen atmosphere.

Next, a method for producing the ferrite powders will be described. As a method for producing the ferrite powders, there are five kinds of production methods for obtaining ferrite powders by successively carrying out following procedures.

(Production method a1) preparation of raw material powders→firing (Production method a2) preparation of raw material powders→granulation→firing (Production method b1) preparation of raw material powders→calcinating→grinding→firing (Production method b2) preparation of raw material powders→calcinating→grinding→granulation→firing (Production method c) preparation of raw material powders→calcinating→grinding→molding→firing→grinding The production method a1 is a method of weighing and mixing raw material powders such as carbonate powders and oxide powders and thereafter, firing the powder mixture at 800° C. to 1050° C. The production method a2 is a method of weighing and mixing raw material powders, and thereafter, granulating and firing the powder mixture at 800° C. to 1050° C. The reason for the firing temperature being set at 800° C. to 1050° C. in the production methods a1 and a2 is as follows. If the firing temperature is less than 800° C., no ferrite phase is produced due to solid phase reaction, and if it exceeds 1050° C., crystal grain growth is caused or agglomeration proceeds and therefore, it is not preferable. In the production methods a1, a2, b1, and b2, the powders after firings may be further grinded. In the production methods a1 and a2, the shrinkage ratio at the time of firing is high as compared with other production methods, powders with relatively small particle diameter tend to be obtained. Further, since the mechanical strength of the powders is relatively low, finer particle diameter tends to be obtained by grinding.

The production method b1 is a method for firing the powders obtained by calcinating and grinding weighed and mixed raw material powders at 950° C. to 1050° C. as they are. The production method b2 is a method for obtaining granulated powders from calcinated and grinded powders obtained by calcinating and grinding weighed and mixed raw material powders and thereafter firing the granulated powders at 950° C. to 1050° C. as they are. In the production methods b1 and b2, since the shrinkage ratio is low as compared with that in the case of production methods a1 and a2, powders with larger particle diameters tend to be obtained. Further, since the calcinated powders are fired, the dispersion of the powders or the powder composition is narrow and uniform powders tend to be obtained. Further, the powders with approximately spherical shapes with particle diameter of about 50 μm to 100 μm tend to be easily produced.

The production method c is a method of producing a ferrite sintered body by the above-mentioned procedure and thereafter grinding the ferrite sintered body. In the production method c, powders with large particle diameter can be obtained as compared with other production methods. However, since generation of fine powders cannot be avoided in the grinding step, it is preferable to remove fine powders by classifying treatment.

In the production of ferrite powders, similarly to the production of the ferrite sintered body, it is preferable to add at least one of Co oxide, Co hydroxide, and Co carbonate as an additive in an amount of 1 wt. % or less on the basis of CoO relative to 100 wt. % of an object material to be added. In this case, the step of adding Co may be carried out before the firing step. That is, in the production methods a1 to c, the raw material powders may be prepared by adding Co to an object material to be added having a composition formula of $(1-x-y-z)(Li_{0.5}Fe_{0.5})O \cdot xZnO \cdot y(Mn, Fe)_2O_3 \cdot zCuO$. And, in the production methods b1, b2, and c, after only the raw material powders excluding Co are previously weighed, mixed, and calcinated, Co is added to the calcinated powders (the object material to be added) and then the resulting powder mixture may be grinded. Alternatively, after adding Co to the grinded powders (the object material to be added) after grinding, the firing may be carried out.

EXAMPLE 1

Example 1 is for proving the reason of limitation of composition of x denoting the content ratio of ZnO in a ferrite material of the present invention.

Carbonate powders and oxide powders being starting raw materials were weighed and mixed to give final compositions of the respective compositions as shown in FIG. 1 $((Li_{0.5}Fe_{0.5})O, ZnO, (Mn, Fe)_2O_3,$ and CuO shown by mol %, in the composition formula, 0.01 for x, y, and z corresponds to 1 mol %) and fired at 900° C. for 3 hours in an atmospheric air. The obtained calcinated powders were wet-grinded to give a size from 0.5 μm to 1.5 μm, and thereafter dried.

The obtained powders were mixed with 1 wt. % of polyvinyl alcohol and granulated to obtain granulated powders, and then the granulated powders were molded respectively into a ring shape of external diameter of 9 mm×inner diameter of 4 mm×thickness of 3 mm; a plate shape of long side of 20 mm×short side of 10 mm×thickness of 5 mm; and a frame shape of external frame of 9.5 mm×inner frame of 4.7 mm×thickness of 2.4 mm at a molding pressure of 150 MPa, and the obtained molded bodies were fired at 1000° C. in an atmospheric air to obtain ferrite materials.

A coil was wound around the obtained respective ring ferrite materials and the initial magnetic permeability μi was measured at f=100 kHz and H=0.4 A/m with an LCR meter (manufactured by HEWLETT PACKARD, apparatus name 4285A). The measurement results are shown in FIG. 1.

Further, with respect to the obtained ring ferrite materials, the relative magnetic permeabilities μ' and μ" at f=1 MHz to 1 GHz and 100 mV of OSC level were measured with an impedance analyzer (manufactured by Agilent E4991A, Fixture 16454A), and the normalized impedance $Z_N$ was calculated according to the following formula (1). The results of normalized impedances $Z_N$ at 30 MHz and 100 MHz are shown in FIG. 1. In the following formula (1), f denotes frequency; $\mu_0$ denotes permeability in vacuum; μ' denotes relative magnetic permeability (real part) of the material; and μ" denotes relative magnetic permeability (imaginary part) of the material.

$$Z_N = 2\Pi f \mu_o (\mu'^2 + \mu''^2)^{1/2} \qquad (1)$$

Further, specimens of long side of 17 mm×short side of 2 mm×thickness of 2 mm were cut out of the obtained plate ferrite materials and a conductive paste was applied to both ends of the respective specimens to measure resistance of the specimens according to two-terminal method. The measurement results are shown in FIG. 1.

Further, coils were wound around the obtained frame ferrite materials, pressure was applied uniaxially at 30 MPa, and the initial magnetic permeabilities μi before and after the pressure application were measured with the same LCR meter described above to measure the change rate of the initial magnetic permeability μi. The measurement results are shown in FIG. 1. In FIG. 1, those having *mark by specimen numbers are Comparative Examples and those having no *mark are Adaptation Example (Examples of the present invention). The meaning of *mark is the same in FIGS. 2 to 5 described below.

As being seen from FIG. 1, with respect to the ferrite materials having the composition formula of (1-x-y-z)(Li$_{0.5}$Fe$_{0.5}$)O.xZnO.y(Mn, Fe)$_2$O$_3$.zCuO, a=Mn/(Mn+Fe), it can be understood that ferrite materials having both 40000 ΩQ/m or more as the normalized impedance $Z_N$ at 30 MHz and 60000 Ω/m or more as the normalized impedance $Z_N$ at 100 MHz as well as satisfying specific resistance of 10$^6$ Ωm or more have been obtained while a range of the content ratio of ZnO being from 0.175 to 0.29. Further, as being seen from the change rate of μi, it can be understood that ferrite materials with small change rate of the initial magnetic permeability by the external stress could be obtained.

EXAMPLE 2

Example 2 is for proving the reason of limitation of composition of y denoting the content ratio of (Mn, Fe)$_2$O$_3$ in a ferrite material of the present invention.

Experiments were carried out in the same manner as Example 1, except that various compositions as final compositions shown in FIG. 2 were used. The results are shown in FIG. 2.

As being seen from FIG. 2, with respect to the ferrite materials having the composition formula of (1-x-y-z)(Li$_{0.5}$Fe$_{0.5}$)O.xZnO.y(Mn, Fe)$_2$O$_3$.zCuO, a=Mn/(Mn+Fe), it can be understood that ferrite materials having both 40000 Ω/m or more as the normalized impedance $Z_N$ at 30 MHz and 60000 Ω/m or more as the normalized impedance $Z_N$ at 100 MHz as well as satisfying specific resistance of 10$^6$ Ωm or more have been obtained while a range of the content ratio of (Mn, Fe)$_2$O$_3$ being from 0.475 to 0.51. Further, as being seen from the change rate of μi, it can be understood that ferrite materials with small change rate of the initial magnetic permeability by the external stress could be obtained.

EXAMPLE 3

Example 3 is for proving the reason of limitation of composition of z denoting the content ratio of CuO, being one of characteristics of a ferrite material of the present invention.

Experiments were carried/out in the same manner as Example 1, except that various compositions as final compositions shown in FIG. 3 were used. The results are shown in FIG. 3.

As being seen from FIG. 3, with respect to the ferrite materials having the composition formula of (1-x-y-z)(Li$_{0.5}$Fe$_{0.5}$)O.xZnO.y(Mn, Fe)$_2$O$_3$.zCuO, a=Mn/(Mn+Fe), it can be understood that ferrite materials having both 40000 Ω/m or more as the normalized impedance $Z_N$ at 30 MHz and 60000 Ω/m or more as the normalized impedance $Z_N$ at 100 MHz as well as satisfying specific resistance of 10$^6$ Ωm or more have been obtained while a range of the content ratio of CuO being from 0.07 to 0.22. Further, as being seen from the change rate of μi, it can be understood that ferrite materials with small change rates of the initial magnetic permeability by the external stress could be obtained.

EXAMPLE 4

Example 4 is for proving the reason of limitation of composition of (Mn/(Mn+Fe)) denoting the content ratio of Mn being one of characteristics of a ferrite material of the present invention.

Experiments were carried out in the same manner as Example 1, except that various compositions as final compositions shown in FIG. 4 were used. The results are shown in FIG. 4.

As being seen from FIG. 4, with respect to the ferrite materials having the composition formula of (1-x-y-z)(Li$_{0.5}$Fe$_{0.5}$)O.xZnO.y(Mn, Fe)$_2$O$_3$.zCuO, a=Mn/(Mn+Fe), it can be understood that ferrite materials having both 40000 Ω/m or more as the normalized impedance $Z_N$ at 30 MHz and 60000 Ω/m or more as the normalized impedance $Z_N$ at 100 MHz as well as satisfying specific resistance of 10$^6$ Ωm or more have been obtained while a range of the Mn/(Mn+Fe) being from 0.02 to 0.055. Further, as being seen from the change rate of μi, it can be understood that ferrite materials with small change rate of the initial magnetic permeability by the external stress could be obtained.

EXAMPLE 5

Example 5 is for proving the effect of addition of Co oxide in a ferrite material of the present invention.

Experiments were carried out in the same manner as Example 1, except that Co$_3$O$_4$ in amounts shown in FIG. 5 on the basis of CoO was added in 100 wt. % of the main component compositions as shown in FIG. 5. The results are shown in FIG. 5.

As being seen from FIG. 5, with respect to the ferrite materials having the composition formula of (1-x-y-z)(Li$_{0.5}$Fe$_{0.5}$)O.xZnO.y(Mn, Fe)$_2$O$_3$.zCuO, a=Mn/(Mn+Fe), it can be understood that the normalized impedances $Z_N$ at 30 MHz and 100 MHz have been improved by adding Co oxide in an amount of 1 wt. % or less on the basis of CoO as an addition amount. Further, specific resistance of 10$^6$ Ωm or more was satisfied and also μi change rate was small by addition of CoO.

EXAMPLE 6

The granulated powders produced in Example 1 were fired at 1000° C. for 3 hours in an atmospheric air without being molded to obtain approximately spherical ferrite materials (ferrite powders) with an average particle diameter of 75 μm. The production method of the ferrite powders corresponds to the above-mentioned production method b2. After 90 wt. % of the obtained ferrite powders and 10 wt. % of a thermoplastic resin were mixed to disperse the ferrite powders in the resin and then heated and kneaded to increase the fluidity of the resin, the mixture was molded and cooled to room temperature to produce a plate electric wave absorber. The electric wave absorption capability of the produced electric wave absorber was measured to find that the electric wave absorber had excellent electric wave absorption capability.

It was confirmed that even if electric wave absorbers were produced by dispersing ferrite powders produced by the production methods other than the production method b2 in thermoplastic resin as in Example 6, it had excellent electric wave absorption capability.

A ferrite material of the invention has high impedance in the high-frequency band and so high specific resistance so as to wind a coil on a core, and at the same time small change of the magnetic characteristics by external stress; can be provided at a low cost; and is most suitable for a core material of coil parts such as noise filters, choke coils or the like, or an electric wave absorber.

As this invention may be embodied in several forms without departing from the spirit of essential characteristics thereof, the present embodiments are therefore illustrative and not restrictive, since the scope of the invention is defined by the appended claims rather than by description preceding them, and all changes that fall within metes and bounds of the claims, or equivalence of such metes and bounds thereof are therefore intended to be embrace by the claims.

What is claimed is:

1. A ferrite material having a composition formula of $(1-x-y-z)(Li_{0.5}Fe_{0.5})O \cdot xZnO \cdot y(Mn, Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of $a = Mn/(Mn+Fe)$;
wherein at least one of Co oxide, Co hydroxide and Co carbonate in an amount of 1 wt. % or less on the basis of CoO is contained in 100 wt. % of the ferrite material.

2. The ferrite material according to claim 1, wherein a normalized impedance $Z_N$ at 30 MHz is 40000 Ω/m or more and a normalized impedance $Z_N$ at 100 MHz is 60000 Ω/m or more.

3. The ferrite material according to claim 1, wherein a specific resistance is $10^6$ Ωm or more.

4. The ferrite material according to claim 1, wherein a change rate of an initial magnetic permeability is within ±10% when a pressure is applied at a pressure of 30 MPa.

5. The ferrite material according to claim 1, wherein the ferrite material is a ferrite sintered body obtained by successively carrying out the respective treatments of calcinating, grinding, molding and firing for raw material powders.

6. The ferrite material according to claim 1, wherein the ferrite material is ferrite powders obtained by firing raw material powders.

7. The ferrite material according to claim 1, wherein the ferrite material is ferrite powders obtained by successively carrying out the respective treatments of calcinating, grinding, and firing for raw material powders.

8. The ferrite material according to claim 1, wherein the ferrite material is ferrite powders obtained by successively carrying out the respective treatments of calcinating, grinding, molding, firing, and grinding for raw material powders.

9. A method for producing a ferrite material, comprising the steps of:
preparing raw material powders having a composition formula of $(1-x-y-z)(Li_{0.5}Fe_{0.5})O \cdot xZnO \cdot y(Mn, Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of $a = Mn/(Mn+Fe)$;
obtaining calcinated powders by calcinating the raw material powders;
obtaining grinded powders by grinding the calcinated powders;
obtaining a molded body by molding the grinded powders;
obtaining a ferrite sintered body by firing the molded body; and
adding at least one of Co oxide, Co hydroxide and Co carbonate, in an amount of 1 wt. % or less on the basis of CoO relative to 100 wt. % of an object material to be added, before the firing is carried out.

10. A method for producing a ferrite material, comprising the steps of:
preparing raw material powders having a composition formula of $(1-x-y-z)(Li_{0.5}Fe_{0.5})O \cdot xZnO \cdot y(Mn, Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of $a = Mn/(Mn+Fe)$;
obtaining ferrite powders by firing the raw material powders; and
adding at least one of Co oxide, Co hydroxide, and Co carbonate in an amount of 1 wt. % or less on the basis of CoO relative to 100 wt. % of an object material to be added, before the firing is carried out.

11. The method for producing a ferrite material according to claim 10, wherein the temperature at the time of firing the raw material powders is 800° C. to 1050° C.

12. A method for producing a ferrite material, comprising the steps of:
preparing raw material powders having a composition formula of $(1-x-y-z)(Li_{0.5}Fe_{0.5})O \cdot xZnO \cdot y(Mn, Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of $a = Mn/(Mn+Fe)$;
obtaining calcinated powders by calcinating the raw material powders;
obtaining grinded powders by grinding the calcinated powders;
obtaining ferrite powders by firing the grinded powders; and
adding at least one of Co oxide, Co hydroxide and Co carbonate in an amount of 1 wt. % or less on the basis of CoO relative to 100 wt. % of an object material to be added, before the firing is carried out.

13. A method for producing a ferrite material, comprising the steps of:
preparing raw material powders having a composition formula of $(1-x-y-z)(Li_{0.5}Fe_{0.5})O \cdot xZnO \cdot y(Mn, Fe)_2O_3 \cdot zCuO$, wherein x, y, z, and a satisfy $0.175 \leq x \leq 0.29$; $0.475 \leq y \leq 0.51$; $0.07 \leq z \leq 0.22$; and $0.02 \leq a \leq 0.055$ in a case of $a = Mn/(Mn+Fe)$;
obtaining calcinated powders by calcinating the raw material powders;
obtaining grinded powders by grinding the calcinated powders;
obtaining a molded body by molding the grinded powders;
obtaining a sintered body by firing the molded body; and
obtaining ferrite powders by grinding the sintered body.

14. The method for producing a ferrite material according to claim 13, further comprising the step of:
adding at least one of Co oxide, Co hydroxide, and Co carbonate in an amount of 1 wt. % or less on the basis of CoO relative to 100 wt. % of an object material to be added, before the firing is carried out.

* * * * *